United States Patent

Ballard

(10) Patent No.: US 9,847,098 B2
(45) Date of Patent: Dec. 19, 2017

(54) DESCRIBED OBJECT AND DESCRIPTOR

(71) Applicant: Hewlett Packard Enterprise Development LP, Houston, TX (US)

(72) Inventor: Curtis C Ballard, Ft. Collins, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 14/914,151

(22) PCT Filed: Aug. 31, 2013

(86) PCT No.: PCT/US2013/057743
§ 371 (c)(1),
(2) Date: Feb. 24, 2016

(87) PCT Pub. No.: WO2015/030831
PCT Pub. Date: Mar. 5, 2015

(65) Prior Publication Data
US 2016/0217810 A1    Jul. 28, 2016

(51) Int. Cl.
*G11B 5/02* (2006.01)
*G11B 5/008* (2006.01)
*G06F 3/06* (2006.01)

(52) U.S. Cl.
CPC ........ *G11B 5/00813* (2013.01); *G06F 3/0607* (2013.01); *G06F 3/0647* (2013.01); *G06F 3/0682* (2013.01)

(58) Field of Classification Search
CPC . G11B 27/3027; G11B 2220/90; G11B 5/012; G11B 27/107; G11B 27/34; G11B 15/52; G11B 20/20; G11B 20/10009; G11B 5/09

USPC .... 360/48, 72.1, 73.04, 51, 72.2, 25, 26, 27, 360/31
See application file for complete search history.

(56) References Cited

U.S. PATENT DOCUMENTS

| | | | |
|---|---|---|---|
| 5,414,570 A * | 5/1995 | Fry | G06F 3/0601 360/48 |
| 6,453,396 B1 | 9/2002 | Boone et al. | |
| 6,675,257 B1 * | 1/2004 | Khalid | G06F 3/0607 707/999.202 |
| 2004/0039889 A1 | 2/2004 | Elder et al. | |
| 2004/0093360 A1 | 5/2004 | Hudson | |
| 2005/0086428 A1 | 4/2005 | Taniyama | |

(Continued)

FOREIGN PATENT DOCUMENTS

| | | |
|---|---|---|
| JP | S6484473 A | 3/1989 |
| JP | H05151716 A | 6/1993 |
| KR | 20030085843 A | 11/2003 |

OTHER PUBLICATIONS

ISR/WO, PCT/US2013/057743, HP reference 83270985, May 22, 2014, 12 pps.

(Continued)

*Primary Examiner* — Nabil Hindi
(74) *Attorney, Agent, or Firm* — Hewlett Packard Enterprise Patent Department (57) ABSTRACT

A described read request may be received. An object and a descriptor may be returned in response to the described read request. The object may be retrieved from a volume. The object may be analyzed to generate the descriptor, which may indicate whether the object is a tape mark or a data record.

20 Claims, 4 Drawing Sheets

(56) References Cited

U.S. PATENT DOCUMENTS

2005/0256999 A1    11/2005   Kishi et al.
2008/0007856 A1     1/2008   Tango et al.
2009/0271455 A1    10/2009   Nagarajan et al.

OTHER PUBLICATIONS

Lauret, J. et al., Need Tape to Tape Copy Program, (Web Page), Feb. 7, 1996, 1p. https://groups.google.com/forurn/?fromgroups#!topic/comp.os.vms/xpZZr15J-KQ.

\* cited by examiner

DESCRIBED OBJECT AND DESCRIPTOR

BACKGROUND

Tape data migration is the process of transferring the data on a source tape volume to a target tape volume. The source or destination tape volumes may be virtual or physical tape volumes. For example, data may be migrated from physical tape to virtual tape to transition to a new backup solution. As another example, data may be migrated from virtual tape to physical tape for archival purposes. As a further example, data may be migrated between different physical tapes to take advantage of improved tape technology.

BRIEF DESCRIPTION OF THE DRAWINGS

Certain examples are described in the following detailed description and in reference to the drawings, in which.

DETAILED DESCRIPTION OF SPECIFIC EXAMPLES

Data may be stored on a tape as a sequence of objects. The objects may include data records interspersed with various tape marks. For example, tape marks may include file marks that delimit the data records as well as marks that indicate partitions, volumes, end of tape, beginning of tape, labels, indexes, and other non-user data structures.

The structure of information may vary greatly between different tape storage implementations. For example, different tapes may have different capacities, may utilize different encoding methods, may or may not support encryption, and may or may not support partitions. As a further example, some tape storage implementations may store data using fixed-size data records, while other implementations may store data using variable-size data records.

File system information may not be available from the information stored on a tape. Instead, tape storage applications may maintain file system information on separate media. Additionally, unlike a hard disk or flash drive, data on a tape may not have location addresses and may require sequential access techniques to retrieve.

To accommodate these features, a tape migration application may map data as the data is retrieved from a source tape volume to recreate a data structure or file system from the retrieved data. The tape migration application may then process the data according to the recreated data structure and issue write commands to a target tape drive to recreate the data structure on a target tape volume. This may require the tape migration application to execute complex instructions and be implemented in a vendor-specific, or tape-format specific manner.

Aspects of the technology may provide described read requests and responses for reading storage volumes. A described data structure may be provided in response to a described read request. The described data structure may include an object and a descriptor describing the object. The returned objects may include tape marks in addition to data records. For example, a described data structure may include a data record and a descriptor indicating that the object is a data record. As another example, a described data structure may include a tape mark and a descriptor indicating that the object is a tape mark. In this example, the descriptor may also indicate the type of tape mark.

The described data structure may be provided to a target drive after a described write request. The target drive may use the described data structure to write an equivalent object using a format specific to the target drive. For example, if a descriptor indicates that the corresponding object is a tape mark, the target drive may write an equivalent tape mark. For example, the source tape mark may have been encoded differently than the target tape mark. Similarly, if a descriptor indicates that a corresponding object is a data record, the target drive may write the data record using a format specific to the target drive. For example, the target drive may write the data record using an encoding method, compression method, or encryption method different than the format used on the source medium. This may allow a user to migrate data to new tapes to take advantage of improved storage or additional available features.

In some implementations, data may be migrated from a source tape to a destination tape by recreating the structure of the source tape on the target tape. In these implementations, the described data structures may provide an intermediate format between the source tape format and the target tape format. This may allow data migration without requiring a migration application to parse the source data or recreate a source file system.

Figure 1:
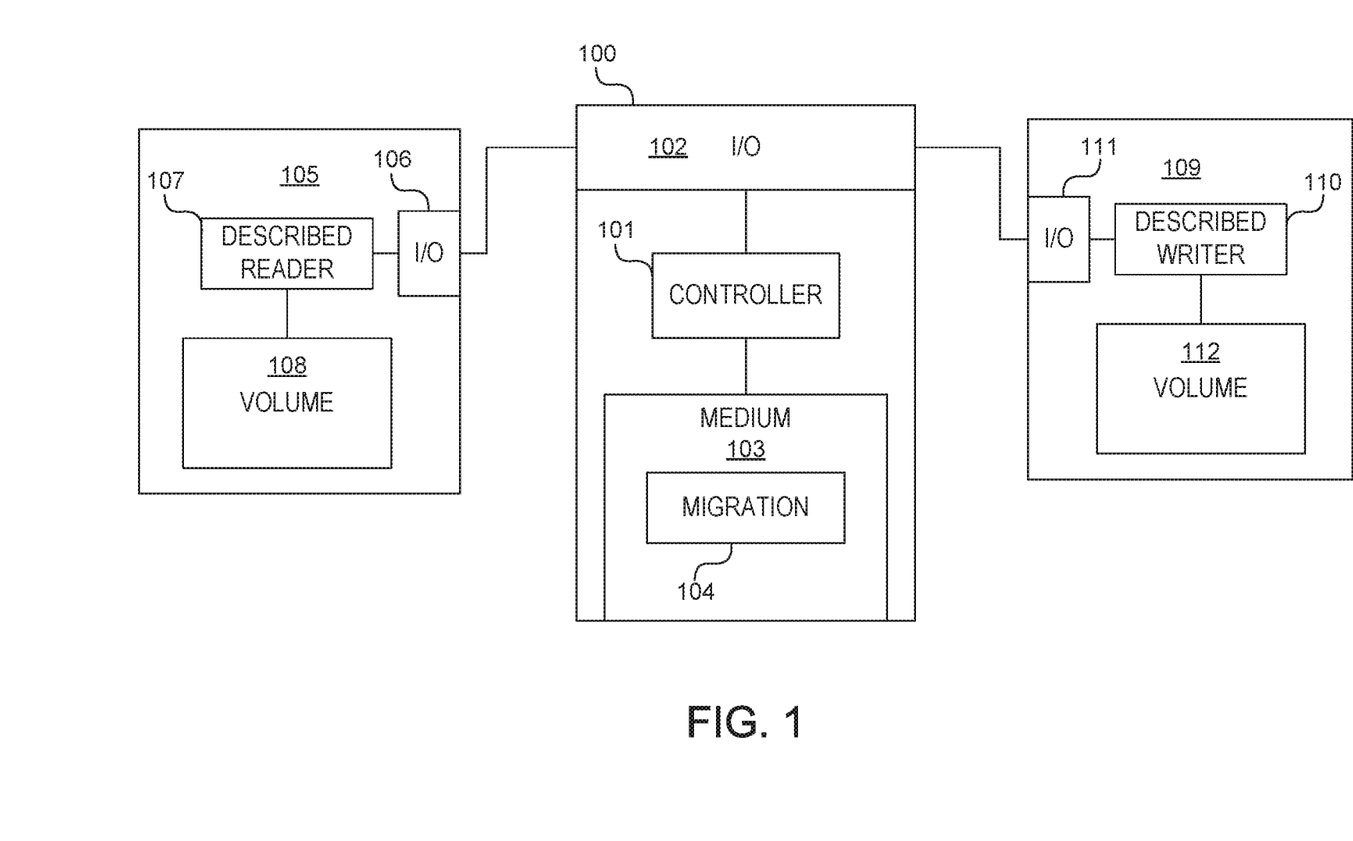
FIG. 1 illustrates an example data migration system utilizing described read and write requests.

FIG. 1 illustrates an example data migration system utilizing described read and write requests. In this example, a computer 100 is connected to a source drive 105 and a target drive 109 via an input/output (I/O) 102, such as a network interface or a SCSI storage interface. The computer 100 may execute a migration application 104 to migrate data from a source volume 108 of the source drive 105 to a target volume 112 of the target drive 109. The migration application 104 may be stored on a non-transitory computer readable medium 103, such as random access memory (RAM), flash memory, or storage. In some implementations, the source drive 105 or target drive 109 may be tape drives and the volumes 108, 112 may be tapes. The source drive 105 or target drive 109 may also be virtual tape drives and the volumes 108, 112 may be virtual tapes.

During data migration, the computer 100 may issue described read requests to source drive 105. Source drive 105 may receive the requests via an I/O 106, such as a network interface or a SCSI storage interface. For example, the described read request may be transmitted to the source drive 105 as a Small Computer Systems Interface (SCSI) command using a Fibre Channel (FC), FC over Ethernet (FCoE), Internet SCSI (iSCSI), or serial attached SCSI (SAS) connection.

The computer 100 may receive described data structures from the source drive 105. The described data structures may be transmitted to the target drive 109. For example, the source computer 100 may transmit a described write request to the target drive 109 via I/O 102, which may be received by the target drive via I/O 111. In some implementations, the described write request may be transmitted to the target drive 109 as a SCSI command using a FC, FCoE, iSCSI, or SAS connection. After receiving an availability acknowledgement, the computer 100 may transmit the described data structures to the source drive.

The source drive 105 may include a described reader 107 connected to the source storage volume 108 and the I/O 106. For example, the described reader 107 may be implemented using hardware, such as application-specific integrated circuits (ASICs) and field-programmable gate arrays (FPGAs), software stored on a non-transitory computer readable medium and executed by a controller, or a combination of hardware and software. The described reader 107 may read the volume 108 and provide a described data structure in response to described read requests from the computer 100. In some implementations, the described data structure includes an object retrieved from the volume 108 and a descriptor indicating whether the object is a tape mark or a data record.

The target drive 109 may include a described writer 110 connected to the target storage volume 112 and the I/O 111. For example, the described writer 110 may be implemented using hardware, such as ASICs and FPGAs, software stored on a non-transitory computer readable medium and executed by a controller, or a combination of hardware and software. The described writer 110 may parse a descriptor of a received described data structure to determine if the object is a tape mark or a data record. The described writer 110 may then write the object to the volume 112. In some implementations, the described writer 110 may write the object to the volume 112 in a different format than how the object was stored in the source volume 108. For example, data may be stored on the source volume 108 using an earlier Linear Tape Open (LTO) standard format and data may be stored on the target volume 112 using a later LTO standard format. As another example, the source volume 108 may be a disk array, cloud storage system, or network attached storage (NAS). In this example, the data on source volume 108 may be physically stored in addressed blocks of disk storage but presented as stored in a virtual tape volume. The target volume 112 may be another virtual tape volume implemented using a disk array, cloud storage system, or NAS, or the target volume 112 may be a tape volume.

Figure 2:
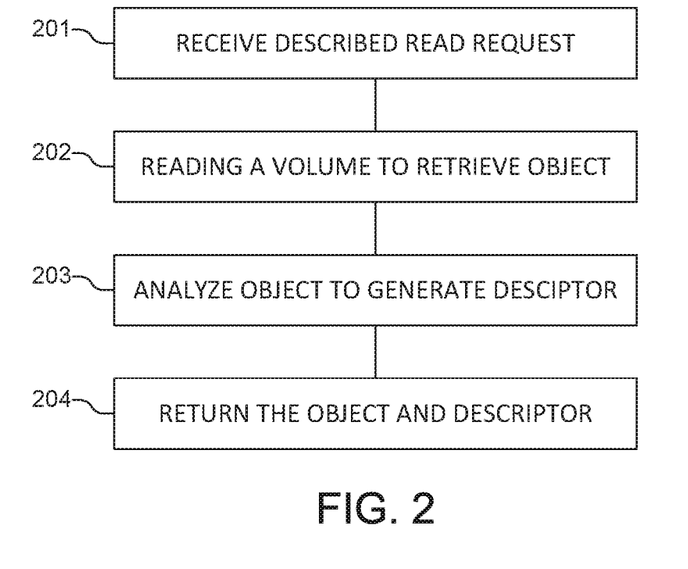
FIG. 2 illustrates an example method of responding to a described read request.

FIG. 2 illustrates an example method of responding to a described read request. For example, the example method may be performed by a source drive, such as the source drive 105 of FIG. 1, during a data migration process.

The example method may include a step 201 of receiving a described read request. For example, the described read request may be in the form of a SCSI command. In some implementations, the described read request may include additional parameters. For example, the described read request may include a parameter indicating the maximum length of the responsive described data structure. As another example, the source drive may support encryption and described read request may include a parameter indicating whether to return encrypted or decrypted data. For example, if a target drive supports the same encryption protocol as the source drive, data may be migrated from the source volume to the target volume without being decrypted. As a further example, the source drive may compress the data prior to storing the data on the source volume. The described read request may include a parameter indicating whether to return compressed or uncompressed data. If the target drive supports the same compression protocol as the source drive, returning compressed data may lower bandwidth requirements or speed data migration.

The example method may also include a step 202 of reading a volume to retrieve an object. For example, the volume may be a tape volume or a virtual tape volume. In some implementations, the object may a tape mark or a data record.

In some implementations, the object may be the next object to be read by the drive. For example, the volume may be sequentially accessed, and the object may be the next object in the sequence after the tape's current location.

In some implementations, if the object is a data record, the data record may be partial data record. For example, the partial data record may be a portion of user data stored between two file marks. For example, if the described read request received in step 201 includes a maximum length, and returning an entire record would exceed the maximum length, the object may be a partial data record not exceeding the maximum length.

In further implementations, step 202 may include reading the volume to retrieve a plurality of objects. For example, if the request received in step 201 included a maximum length, the plurality of objects may be a set of objects having a total length less than the maximum length.

The example method may also include a step 203 of analyzing the object to generate a descriptor indicating whether the object is a tape mark or a data record. For example, if the object is a tape mark, the descriptor may indicate whether the object is a file mark, a partition mark, an end of tape indicator, a beginning of tape indicator, a volume indicator, or other type of tape mark. In some implementations, the descriptor may be a bit sequence in a range of a mapping from object types to bit sequences. For example, a different bit sequence may for a file mark, a partition mark, a partial data record, a whole data record, a compressed data record, an uncompressed data record, an encrypted data record, an unencrypted data mark, and for each other type of object that may be retrieved.

In some implementations, the descriptor may also indicate other parameters related to the object. For example, the descriptor may have a first field indicating whether the object is a tape mark or a data record, and may have a second field indicating the length of the object.

If step 202 includes reading the volume to retrieve a plurality of objects, then step 203 may include analyzing the plurality of objects to generate a corresponding plurality of descriptors. Each descriptor may indicate whether a corresponding object is a tape mark or a data record. Additionally, each descriptor may indicate a location of a subsequent descriptor. For example, if each descriptor precedes its corresponding object, the each descriptor may include a field signifying the length of its corresponding object. This may indicate the location of the subsequent descriptor.

In some implementations, if step 202 includes reading the volume to retrieve a plurality of objects, then step 203 may include analyzing the plurality of objects to generate a different descriptor for each sequence of identical object types. For example, if the plurality of objects includes a sequence of multiple data records, a single descriptor may be generated to describe the sequence of data records. As another example, if the plurality of objects includes a sequence of multiple file marks, a single descriptor may be generated to describe the sequence of file marks. In these implementations, the generated descriptor may include a field indicating the number of objects described by the descriptor.

The example method may also include a step 204 of returning the object and the descriptor. For example the object and the descriptor may be returned together in a described data structure. If the described read request includes a parameter indicating a returned data type, such as encrypted or unencrypted, or compressed or uncompressed, then the data record may be returned in the format indicated by the parameter. In some implementations, the descriptor may indicate the format of the data record. If step 202 includes reading the volume to retrieve a plurality of objects, then step 204 may include return the plurality of objects and the corresponding descriptors. In some implementations, the plurality of objects may be returned in the same order as they are stored on the storage volume. In other implementations, the plurality of objects may be returned in a different order than how they are stored on the storage volume. In these implementations, the described read request may specify whether the objects are returned in their stored order or in a different order.

Figure 3:
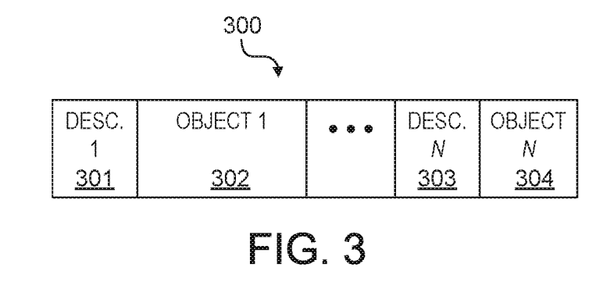
FIG. 3 illustrates an example described data structure.

FIG. 3 illustrates an example described data structure 300 that may be returned in step 204. For example, the example described data structure 300 may be all or a part of a payload of a described data structure. In this example, the structure 300 is organized as a sequence of pairs of descriptors 301, 303 each followed by the objects 302, 304 that they describe. For example, each descriptor 301, 303 may form a header and each object 302, 304 may form a body. In some implementations, the descriptors 301, 303 include an indication of the location of a subsequent descriptor. For example, the first descriptor 301 may include a length field signifying the length of object 302. This may indicate the location of the second descriptor as immediately following the first object 302. In further implementations, a descriptor 301, 303 may describe multiple objects 303, 304. For example, a descriptor 301, 303 may describe a sequence of objects having the same type. In these implementations, a descriptor 301, 303 may include a sequence length field indicated the number of objects 302, 304 described by the corresponding descriptor 301, 303.

In some implementations, the set of objects 302, 304 has a total length less than or equal to a maximum length. In some implementations, the maximum length may be set by the request received in step 201. In other implementations, the maximum length is set a priori. For example, the maximum length may be set by a tape drive manufacture or application as a fixed transfer size used for a fixed size access mode. In various implementations, partial data records may be allowed as objects 302, 304. For example, if including an entire data record as a last object 304 would exceed the maximum length, the last object 304 may be a partial data record. As another example, the maximum length may be smaller than the size of an entire data record and the structure 300 may include only a single partial data record as an object 302. In other implementations, partial data records may not be allowed as objects 302, 304. In such implementations, the data structure 300 may include as many objects 302, 304 as possible without exceeding the maximum length. The object following the last object 304 may be included in a subsequent data structure 300 returned after a subsequent step 204.

Figure 4:
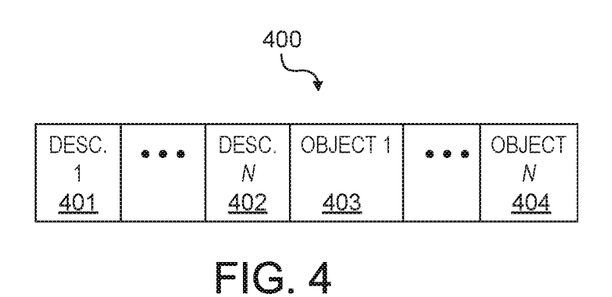
FIG. 4 illustrates another example described data structure.

FIG. 4 illustrates another example described data structure 400 that may be returned in step 204. In this example, the descriptors 401, 402 are included in a first portion of the data structure 400 and the objects 403, 404 are included in a second portion of the data structure. For example, the descriptors 401, 402 may be included in a header of the data structure and the objects 403, 404 may be included in a body of the data structure. The objects 403, 404 and the descriptors 401, 402 may be otherwise similar to the objects 302, 304 and descriptors 301, 303 of data structure 300.

Figure 5:
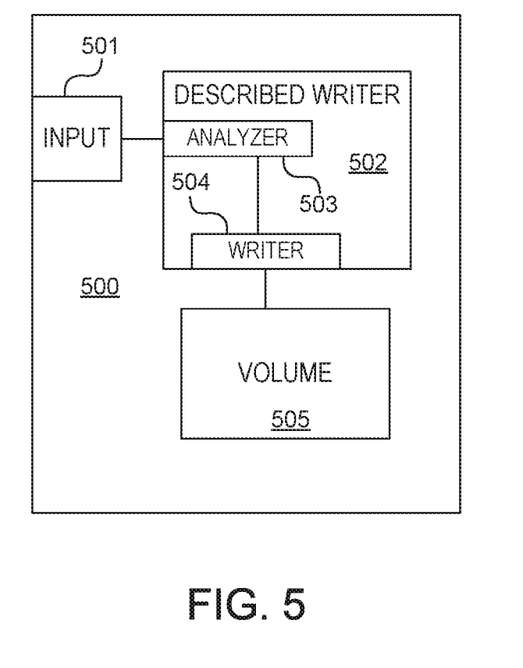
FIG. 5 illustrates an example drive including a described writer.

FIG. 5 illustrates an example drive 500 including a described writer 502. For example, the example drive 500 may be a target drive, such as drive 109 of FIG. 1, in a tape migration operation. In various implementations, the example drive 500 may be a tape drive or a virtual tape drive.

The example drive 500 may include an input 501 to receive a described data structure. For example, the input 501 may be an interface, such as an FC interface, FCoE interface, SATA interface, or other storage drive interface. The described data structure may include an object and descriptor indicating whether the object is a tape mark or a data record. In some implementations, the described data structure may include a plurality of pairs of objects and corresponding descriptors. For example, the described data structure may be of the type illustrated and described with respect to FIG. 3 or 4.

The example tape drive 500 may also include a described writer 502, which may include an analyzer 503 and a writer 504. For example, the described writer 502 may be similar to the described writer 110 of drive 109. In some implementations, the described writer 502 may be implemented in hardware, software, or a combination of the two. For example, the described writer 502 may be implemented using ASICS, FPGAs, or software stored on a non-transitory computer readable medium and executed by a controller.

The analyzer 503 may parse the descriptor of the described data structure to determine whether the object is a tape mark or a data record. In some implementations, if the object is a tape mark, the analyzer 503 may parse the descriptor to determine what type of tape mark it is. Additionally, if the object is a data record, the analyzer 503 may parse the descriptor to determine the data record's format. For example, the analyzer 503 may determine if the data record is compressed, uncompressed, encrypted, or unencrypted. If the analyzer 503 determines that the data record is compressed or encrypted, the analyzer 503 may instruct the writer 504 to forego compression or encryption steps that might otherwise occur.

As discussed above, in some implementations, the described data structure includes a plurality of pairs of descriptors and corresponding objects. In these implementations, the analyzer 503 may parse each respective descriptor of the plurality of pairs. The analyzer 503 may determine whether each respective corresponding object is a tape object or data record. Additionally, in some implementations, the descriptor may include a location of a subsequent descriptor. For example, the descriptor may include a field indicating the length of the corresponding object. If the described data structure has an alternating arrangement of descriptor and corresponding object, this length field may indicate the location of the subsequent descriptor. In these implementations, the analyzer 503 may analyze the descriptor to determine the location of the subsequent descriptor. The analyzer 503 may then analyze the subsequent descriptor to determine if a subsequent object is a tape mark or data record.

The writer 504 may write the tape mark or data record to a storage volume 505. For example, the storage volume 505 may be a volume on a tape and the writer 504 may include a write head. As another example, the volume 505 may be a virtual tape drive. The writer 504 may write the tape mark or data record to the storage volume 505 in a different format than the one in which tape mark or data record was originally stored. For example, the data record may have been stored in a first LTO generation format and the writer 504 may write the data record using a second, different LTO generation format. As another example, the data record may have been stored in an unencrypted state, and the writer 504 may store the data record in an encrypted state. As a further example, the data record may been stored in a virtual tape drive as data blocks on a hard disk array, and the writer 504 may store the data record on a tape volume 505.

As discussed above, in some implementations, the described data structure includes a plurality of pairs of descriptors and corresponding objects. In these implementations, the writer 504 may write each respective tape mark or data record of the plurality of pairs.

Figure 6:
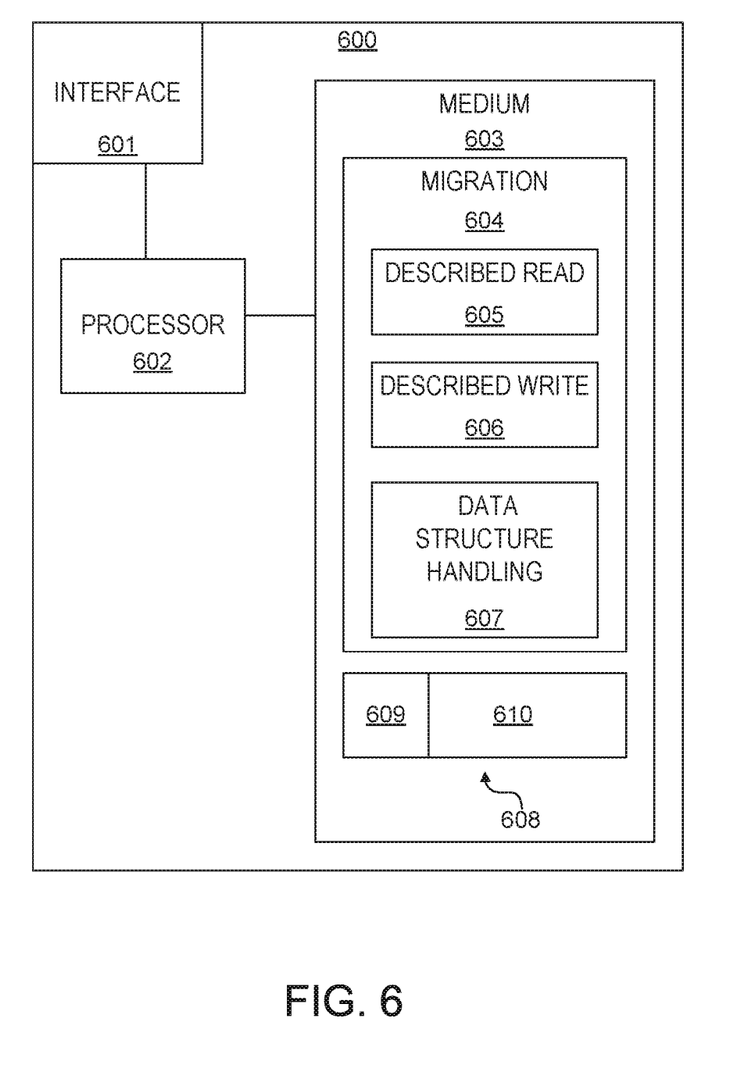
FIG. 6 illustrates a computer including a non-transitory computer readable medium storing migration instructions.

FIG. 6 illustrates a computer 600 including a non-transitory computer readable medium 603 storing migration instructions 604. In various implementations, the non-transitory medium 603 may include media such as random access memory (RAM), flash memory, storage, other non-volatile media, or a combination thereof. The computer 100 may include an interface 601 to connect to source or target drives. The computer 100 may also include a processor 602 connected to the interface 601 and the non-transitory medium 603 to execute the migration instructions 604.

The computer 600 may execute the migration instructions 604 to migrate the contents of a source volume on a source drive to a target volume on a target drive. For example, the computer 600 may operate in a manner similar to the computer 100 of FIG. 1.

The instructions 604 may include a described read request instruction set 605. When executed, the described read instruction set 605 may cause the processor 602 to transmit a described read request to a drive. For example, the processor 602 may use the interface 601 to transmit a described read request to a source drive, such as source drive 105 of FIG. 1. In some implementations, the described read request may include fields specifying parameters of a desired described data structure. For example, the described read request may include a maximum return length, a request for compressed or uncompressed data, or a request for encrypted or unencrypted data.

The instructions 604 may also include described data structure handling instructions 607. When executed, the handling instructions may cause the processor 602 to receive a described data structure 608 from the drive. The processor 602 may use the interface 601 to receive the described data structure 608 and may store the described data structure 608 in the medium 603. For example, the computer 600 may temporarily store the described data structure 608 in RAM, while the instructions 604 are stored in persistent storage. The described data structure 608 may include an object 610 and a descriptor 609. The descriptor 609 may indicate whether the object 610 is a tape mark or a data record. For example, the described data structure 608 may be generated by a source drive, such as source drive 105, after performing a described read method, such as the method described with respect to FIG. 2. In some implementations, the described data structure 608 may have the format described with respect to FIG. 3 or 4.

In some implementations, the instructions 604 further include a described write request instruction set 606. When executed, the described write request instructions set 606 may cause the processor 602 to transmit a described write request to a second drive. For example, the processor 602 may use the interface 601 to transmit the described write request to a target drive. For example, the second drive may be similar to drive 109 of FIG. 1 or drive 500 of FIG. 5. In these implementations, the described data structure handling instructions 607 may cause the processor 602 to transmit the described data structure 608 to the second drive.

In some implementations, when executed, the migration instructions 604 cause the processor 602 to migrate contents of a volume of the first drive to a volume of the second drive.

For example, the migration instructions 604 may cause the processor 602 to repetitively execute the described read request instructions 605 to transmit a plurality of described read requests to the first drive. The migration instructions 604 may also cause the processor 602 to repetitively execute the handling instructions 607 to receive a plurality of described data structures 608 and to transmit the plurality of described data structures 608 to the second drive. In some implementations, the described data structures 608 may be transmitted in the same order they are received. Additionally, the order of the tape marks and data records may be preserved in the described data structures 608. Accordingly, the computer 600 may migrate the contents of a source drive to a target drive by using the described data structures 608 as an intermediate data structure without recreating the source tape data structure or file system using retrieved data.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method, comprising:
   at a drive, receiving from a host device a described read request that requests return of a described data structure, wherein each described data structure comprises an object and a descriptor for the object that indicates whether the object is a tape mark or a data record;
   reading, via the drive, a volume to retrieve a first object;
   analyzing, via the drive, the first object to generate a first descriptor indicating whether the first object is a tape mark or a data record; and
   in response to the described read request, returning to the host device, from the drive, a first described data structure comprising the first object and the first descriptor.

2. The method of claim 1, wherein:
   the described read request includes a maximum length;
   analyzing the first object comprises analyzing a plurality of objects including the first object to generate a corresponding plurality of descriptors including the first descriptor, each descriptor of the plurality of descriptors indicating whether a corresponding object of the plurality of objects is a tape mark or a data record;
   the plurality of objects has a total length less than or equal to the maximum length; and
   the first described data structure includes the plurality of objects and the corresponding plurality of descriptors.

3. The method of claim 2, wherein the plurality of objects is stored on the volume in an order and the plurality of objects is arranged in the first described data structure in the order.

4. The method of claim 1, wherein the first object is a partial data record.

5. The method of claim 1,
   wherein the drive is one of a tape drive and a virtual tape drive, and
   the volume is one of a physical tape volume and a virtual tape volume.

6. The method of claim 1, wherein:
   the first data structure includes a sequence of identically typed objects including the first object; and analyzing the first object comprises analyzing the sequence of identically typed objects to generate the first descriptor, and the first descriptor corresponds to each object of the sequence of objects and indicates whether each of the objects in the sequence of objects is a tape mark or a data record.

7. A drive, comprising:

an input of the drive to receive from a host device, a described data structure comprising a first object and a first descriptor indicating whether the first object is a tape mark or a data record;

an analyzer of the drive to parse the first descriptor to determine whether the first object is a tape mark or a data record; and a writer of the drive to write a first equivalent tape mark or a first equivalent data record to a volume of the drive in a first format specific to the drive, the first equivalent tape mark or the first equivalent data record being an equivalent of the first object.

8. The drive of claim 7, wherein:

the described data structure comprises a plurality of pairs of descriptors and corresponding objects including the first object and the first descriptor;

the analyzer is to parse each respective descriptor of the plurality of pairs to determine whether each respective corresponding object is a tape mark or data record; and for each of the plurality of pairs, the writer is to write an equivalent tape mark or an equivalent data record to the volume in the first format, the equivalent tape mark or the equivalent data record being an equivalent of the object of the respective pair.

9. The drive of claim 8, wherein:

the objects of the described data structure are in an order; and the writer is to write the equivalent tape marks or equivalent data records to the volume in the order.

10. The drive of claim 7, wherein:

the first descriptor indicates a format of the.

11. A non-transitory computer readable medium storing instructions, which when executed, cause a processor to:

transmit a described read request to a first drive, where each described read request is to command the source drive to return a described data structure that comprises an object and a descriptor for the object that indicates whether the object is a tape mark or a data record; and receive a first described data structure from the first drive, the first described data structure comprising a first object and a first descriptor indicating whether the first object is a tape mark or a data record.

12. The non-transitory computer readable medium of claim 11, storing further instructions, which when executed, cause the processor to:

transmit a described write request to a second drive; and transmit the first described data structure to the second drive.

13. The non-transitory computer readable medium of claim 12, storing further instructions, which when executed, cause the processor to:

migrate contents of a first volume of the first drive to a second volume of the second drive by transmitting a plurality of described read requests, including the described read request, to the first drive and transmitting a plurality of described data structures, including the first described data structure, to the second drive.

14. The method of claim 1, wherein the described read request specifies a format, and the method further comprises including, via the drive, the first object in the described data structure in the specified format.

15. The method of claim 1, wherein the described read request specifies a compression state, and the method further comprises including, via the drive, the first object in the described data structure in the specified compression state.

16. The method of claim 1, wherein the described read request specifies an encryption state, and the method further comprises including, via the drive, the first object in the described data structure in the specified encryption state.

17. The drive of claim 7, wherein the objects in the described data structure have a second format that is different from the first format.

18. The non-transitory computer readable medium of claim 13, wherein the processor is to send the described data structure to the second drive without parsing the described data structure.

19. The non-transitory computer readable medium of claim 12, storing further instructions, which when executed, cause the processor to:

when the first drive and the second drive support the same encryption protocol, specify in the described read request that objects be included in the described data structure in an encrypted state.

20. The non-transitory computer readable medium of claim 12, storing further instructions, which when executed, cause the processor to:

when the first drive and the second drive support the same compression protocol, specify in the described read request that objects be included in the described data structure in a compressed state.

* * * * *